United States Patent
Vaid et al.

(10) Patent No.: US 11,651,627 B2
(45) Date of Patent: May 16, 2023

(54) SENSOR NETWORK FOR OPTIMIZED MAINTENANCE SCHEDULE

(71) Applicant: Oracle International Corporation, Redwood Shores, CA (US)

(72) Inventors: Amit Vaid, Karnataka (IN); Neha Tomar, Karnataka (IN); Utkarsh Milind Desai, Bangalore (IN); Vijayalakshmi Krishnamurthy, Sunnyvale, CA (US); Goldee Udani, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 721 days.

(21) Appl. No.: 16/699,023

(22) Filed: Nov. 28, 2019

(65) Prior Publication Data
US 2021/0166499 A1 Jun. 3, 2021

(51) Int. Cl.
*G07C 5/00* (2006.01)
*G05B 23/02* (2006.01)
(Continued)

(52) U.S. Cl.
CPC ........... *G07C 5/006* (2013.01); *G05B 23/024* (2013.01); *G05B 23/0283* (2013.01);
(Continued)

(58) Field of Classification Search
CPC .... G07C 5/006; G07C 5/0808; G05B 23/024; G05B 23/0283; G06Q 10/0635;
(Continued)

(56) References Cited

U.S. PATENT DOCUMENTS

| 5,710,723 A | 1/1998 | Hoth et al. |
| 8,356,207 B2 | 1/2013 | Hosek et al. |

(Continued)

FOREIGN PATENT DOCUMENTS

CN 109460567 † 3/2019

OTHER PUBLICATIONS

Harrou, Kullback-Leibler distance-based enhanced detection of incipient anomalies, Aug. 31, 2016, 15 pages (Year: 2016).

(Continued)

*Primary Examiner* — Michael V Kerrigan
(74) *Attorney, Agent, or Firm* — Potomac Law Group, PLLC

(57) ABSTRACT

Embodiments determine an optimized maintenance schedule for a maintenance program that includes multiple levels, each level including at least one asset (i.e., asset type) and at least one of the levels including a plurality of assets. Embodiments receive historical failure data for each of the assets, the historical failure data generated at least in part by a sensor network. For each asset, embodiments generate a probability density function ("PDF") using kernel density estimation ("KDE"). For each asset, based on a reliability rate threshold, embodiments determine a cumulative density function ("CDF") using the PDF. For each asset, embodiments determine an optimized time to failure ("TTF") using the CDF. Embodiments then create the schedule for each level that includes a minimum TTF for the assets at each level.

20 Claims, 17 Drawing Sheets

(51) Int. Cl.
*G06Q 10/0635* (2023.01)
*G06Q 10/20* (2023.01)
*G07C 5/08* (2006.01)

(52) U.S. Cl.
CPC ......... *G06Q 10/0635* (2013.01); *G06Q 10/20* (2013.01); *G07C 5/0808* (2013.01)

(58) Field of Classification Search
CPC ........ G06Q 10/20; G06N 7/005; G06N 20/10; G06F 40/18; G06F 17/18
See application file for complete search history.

(56) References Cited

U.S. PATENT DOCUMENTS

| | | |
|---|---|---|
| 2015/0227838 A1† | 8/2015 | Wang et al. |
| 2016/0217378 A1 | 7/2016 | Bellala et al. |
| 2017/0177812 A1 | 6/2017 | Sjölund |
| 2017/0309094 A1* | 10/2017 | Farahat .............. G05B 23/0283 |
| 2018/0120200 A1† | 5/2018 | Bechhoefer et al. |
| 2018/0177415 A1 | 6/2018 | Madl |
| 2019/0235484 A1† | 8/2019 | Ristovski et al. |
| 2020/0050825 A1 | 2/2020 | Mendoza-Schrock |
| 2021/0095996 A1 | 4/2021 | Gvd et al. |

OTHER PUBLICATIONS

Kim et al., Robust Kernel Density Estimation, 2012, 37 Pages (Year: 2012).

Xie, Distributed Segment-Based Anomaly Detection With Kullback-Leibler Divergence in Wireless Sensor Networks, IEEE Transactions on Information Forensics and Security, vol. 12, No. 1, Jan. 2017, 10 pages (Year: 2017).

Unknown, "Oracle Maintenance Cloud", Oracle Business Process Services, last downloaded on Nov. 27, 2019.

Google Patents Translation of CN109460567A. Abstract. https://patents.google.com/patent/CN109460567A/en?oq=CN109460567.†

Weglarczyk, Stanislaw. Kernel density estimation and its application. ITM Web of Conferences. vol. 23. EDP Sciences, 2018.†

* cited by examiner
† cited by third party

Fig. 3 [Prior Art]

SENSOR NETWORK FOR OPTIMIZED MAINTENANCE SCHEDULE

FIELD

One embodiment is directed generally to a sensor network, and in particular to sensor network that determines an optimized maintenance schedule for assets.

BACKGROUND INFORMATION

The Internet of Things ("IoT") is the extension of Internet connectivity into physical devices and everyday objects. Embedded with electronics, Internet connectivity, and sensors, these devices can communicate and interact with others over the Internet, and they can be remotely monitored and controlled. In some instances, an IoT device can be used to monitor the operating conditions and status of a particular "asset" such as a vehicle part

SUMMARY

Embodiments determine an optimized maintenance schedule for a maintenance program that includes multiple levels, each level including at least one asset (i.e., asset type) and at least one of the levels including a plurality of assets. Embodiments receive historical failure data for each of the assets, the historical failure data generated at least in part by a sensor network. For each asset, embodiments generate a probability density function ("PDF") using kernel density estimation ("KDE"). For each asset, based on a reliability rate threshold, embodiments determine a cumulative density function ("CDF") using the PDF. For each asset, embodiments determine an optimized time to failure ("TTF") using the CDF. Embodiments then create the schedule for each level that includes a minimum TTF for the assets at each level.

DETAILED DESCRIPTION

Embodiments gather sensor data for a type of asset and, using a non-parametric kernel density approach, determine a probability density function curve for a failure pattern of the asset part. Embodiments determine a cumulative probability of failure from the probability density function curve and then determine an optimized maintenance schedule with multiple levels for the type of asset or for multiple different type of assets that may be part of a maintenance program.

Figure 1:
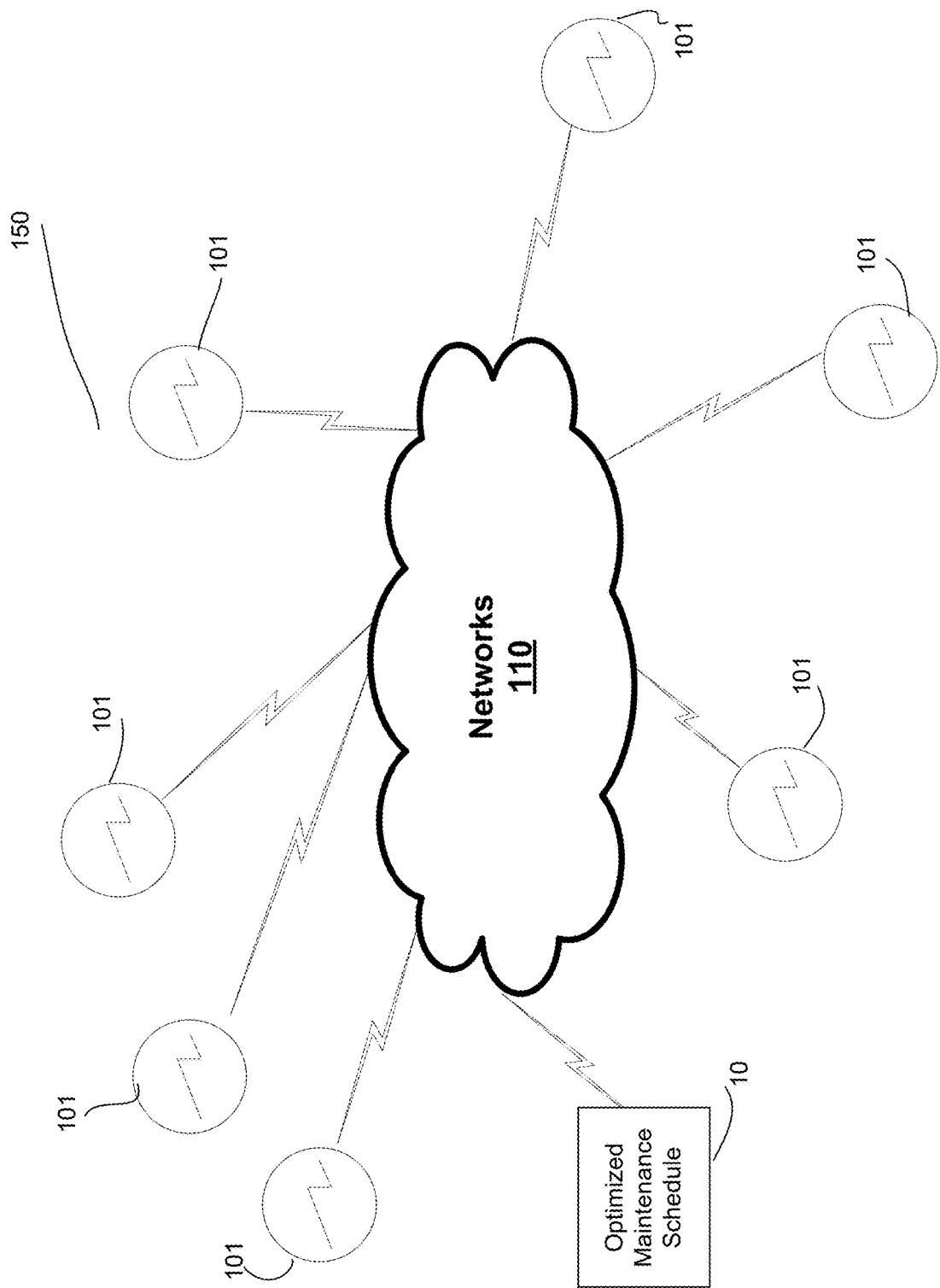
FIG. 1 is an overview diagram of elements of an optimized maintenance schedule network/system that can implement embodiments of the invention.

FIG. 1 is an overview diagram of elements of an optimized maintenance schedule network/system 150 that can implement embodiments of the invention. Sensor based network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101 (hundreds, thousands, or even millions or billions of sensors, for example).

An IoT device can be any device that has a sensor attached to it and can transmit data from one object to another or to people with the help of the Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

In network 150, each sensor 101 may be coupled, directly or indirectly, to an asset in order to monitor the use of the asset and ultimately to determine an optimized maintenance schedule for the asset, as disclosed below. The type of asset can be any asset that can be monitored and typically requires a maintenance schedule. Examples of assets can include any type of vehicle part, such as a battery, a filter, a brake, etc., an industrial part such as a pump or a compressor or motor, an electronic part such as a rotating hard drive, a fan, etc.

Each of sensors 101 communicate, wirelessly or wired, through one or more networks 110. Networks 110 include the Internet, but may also include private on-premise networks that ultimately interface with the Internet as well as any other type of network that allows sensors 101 to communicate. Sensors 101 can be part of the "IoT Asset Monitoring Cloud Service" from Oracle Corp.

An optimized maintenance schedule system/server 10 is coupled to networks 110 to send and receive data from sensors 101. Optimized maintenance schedule server 10 provides the optimized maintenance schedule determination functionality disclosed herein. In general, optimized maintenance schedule server 10 monitors data acquired by each of sensors 101 for purposes of accumulating the data and then performing technical calculations to determine optimized maintenance schedules for each type of asset.

Sensors 101 can be largely dispersed geographically, such as with temperature sensors located throughout the world, or more locally dispersed. For example, a machine can be fitted with sensors 101 to monitor its operation. These sensors measure quantities such as temperature, pressure, and vibration amplitude for the different parts of the machine. If there is some malfunction or any other abnormality, some of these readings will deviate significantly from the norm. For example, it may be the case that a small part of the engine is overheated when compared to the rest of the engine, or that the entire engine is overheated when compared to the rest of the machine.

Figure 2:
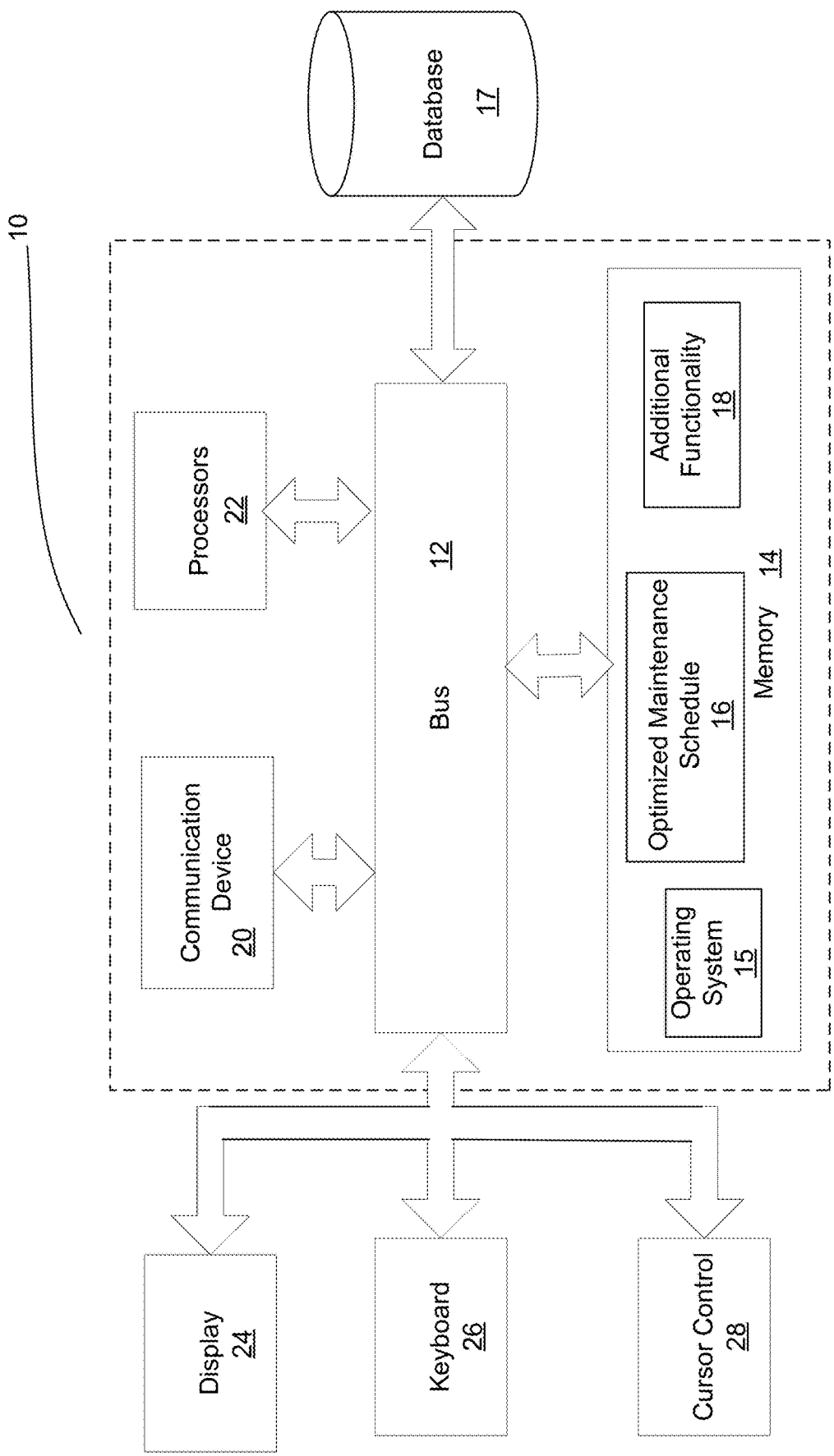
FIG. 2 is a block diagram of optimized maintenance schedule server of FIG. 1 in the form of a computer server/system in accordance with an embodiment of the present invention.

FIG. 2 is a block diagram of optimized maintenance schedule server 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an optimized maintenance schedule module 16 that determines an optimized maintenance schedule for an asset using a network of sensors, and all other functionality disclosed herein. System 10 can be part of a larger system. Therefore, system 10 can include one or more additional functional modules 18 to include the additional functionality, such as the "IoT Asset Monitoring Cloud Service" from Oracle Corp. or the "Oracle Maintenance Cloud." A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

In general, an asset can be part of an "asset group". For example, parts of an automobile can be an asset of an asset group such as a Toyota Prius or Camry. There may be a pre-defined maintenance program with multiple levels for that asset group, particularly when the asset group is an automobile. For example, for a Toyota Camry, there may be the following suggested maintenance program levels:

A 5,000 mile service with operation set x where x=(Oil Filter change, Brake pad change);

A 10,000 mile service with operation set y where y=(Engine check, Door check);

A 30,000 mile service with operation set z where z=(Battery change, Tire rotation).

In the above programs, operations of y will include x given 10,000 is a multiple of 5,000, and so on for other programs. The program may be based on the calendar (e.g., every 3 month service) or miles. However, these maintenance programs may not be optimal in terms of the failure patterns of the assets. In general, assets (e.g., machinery, electronic parts, automobile parts, etc.) do not follow a normal distribution. As a result, determining an optimal maintenance schedule is challenging which often results in either the failure of assets or the wastage of the useful lifespan of the assets.

Specifically, known maintenance programs are typically generated based on "Mean Time to Failure" ("MTTF") calculations, which measure the average time or miles until a part fails. It is calculated by summing the historical time or miles to failure for each failed part and dividing by the number of parts. MTTF is typically used to set part replacement intervals: ideally, replacing parts before failure, but not too soon before failure.

Figure 3:
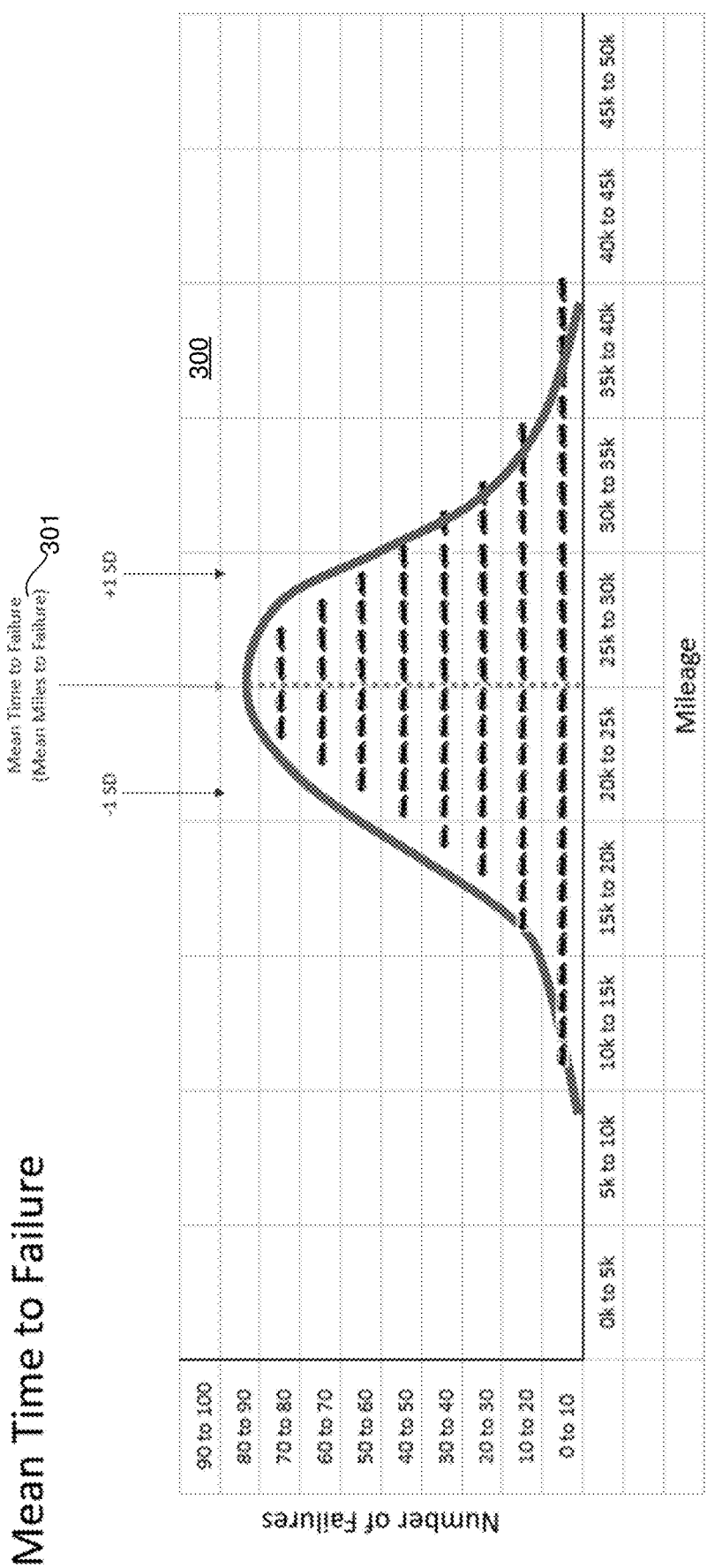
FIG. 3 is a graph illustrating an MTTF calculation for an asset.

FIG. 3 is a graph 300 illustrating a MTTF calculation for an asset (i.e., a type of asset instead of an individual asset). In the example of FIG. 3, and all other examples that follow unless otherwise specified, the asset is a car battery. However, embodiments are applicable to any type of asset monitored by a sensor in a sensor network, such as sensor network 150 of FIG. 3.

In the example of FIG. 3, the MTTF for car batteries is 25k miles as indicated at 301. Knowing this, a maintenance manager may set the maintenance interval to replace batteries at 20k. This is well before the average battery fails, but not so soon that too much useful battery life is wasted. In this example, most of the failures occur within 1 standard deviation of the mean and the distribution is fairly normal.

Figure 4:
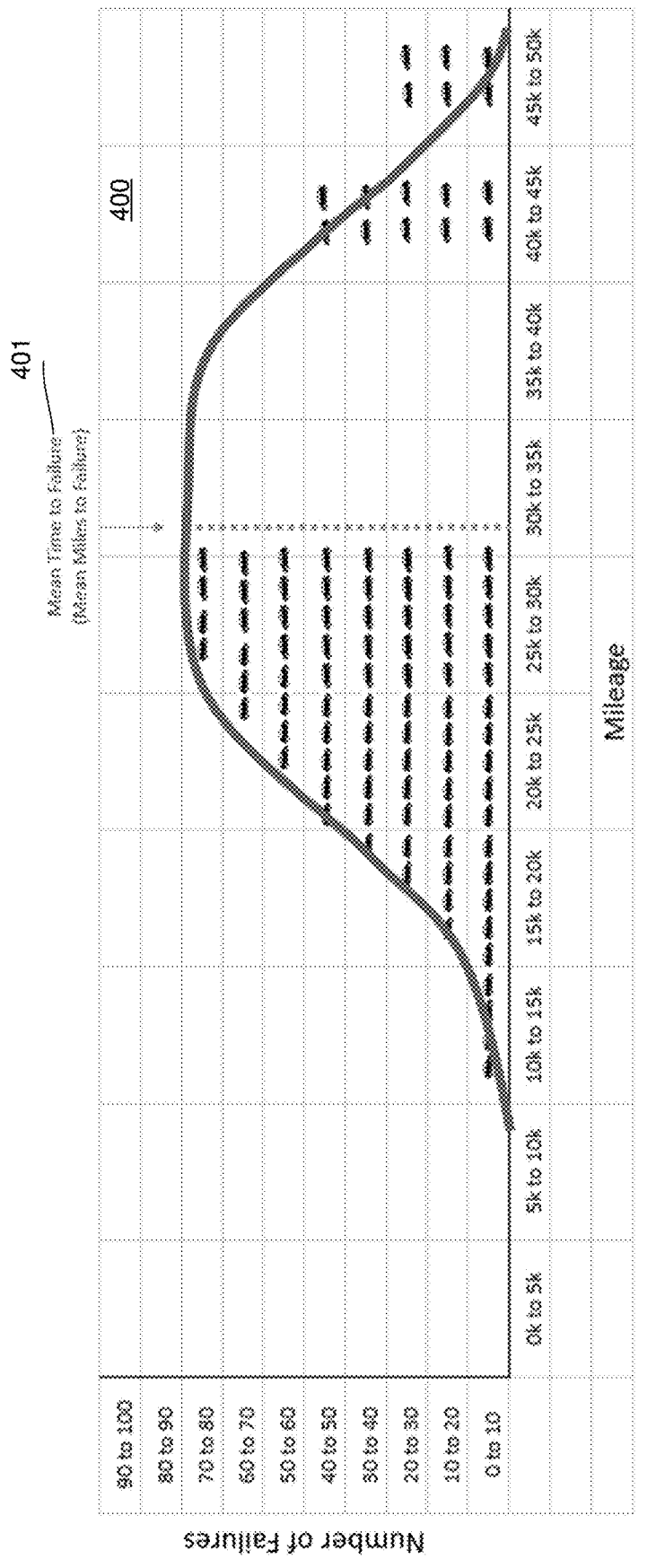
FIG. 4 is a graph illustrating another MTTF calculation for an asset.

FIG. 4 is a graph 400 illustrating another MTTF calculation for an asset. Unlike FIG. 3, the time to failure ("TTF") in FIG. 4 is not as "normal" but is more typical for assets such as car batteries. In this example, most batteries still fail at around 25k miles, but the long-lasting outliers raise the MTTF to 31k (at 401), well above the mileage where the majority of batteries fail. Knowing the MTTF is 31k miles, a maintenance manager may set the maintenance interval to replace batteries at 26k. However, more than half of the batteries would have failed before 26k. Therefore, for this distribution, using the MTTF to set maintenance intervals would result in a lot of battery failures.

Figure 5:
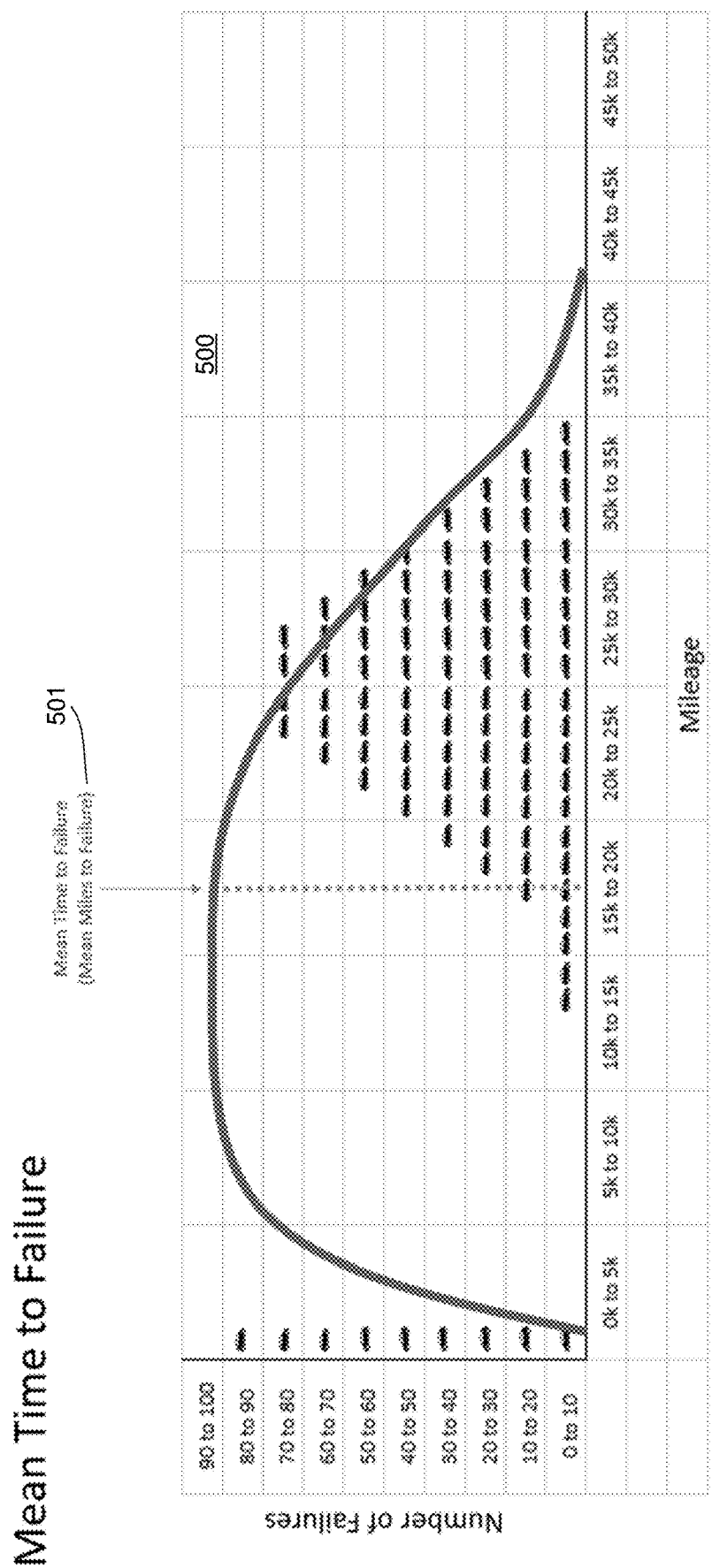
FIG. 5 is a graph illustrating another MTTF calculation for an asset.

FIG. 5 is a graph 500 illustrating another MTTF calculation for an asset. In this example, most batteries still fail at around 25k miles, but the fast-failing outliers lower the average to 17.5k (at 501), well below the mileage where the majority of batteries fail. Knowing the MTTF is 17.5k miles, a maintenance manager may set the maintenance interval to replace batteries at 12.5k miles. However, that means most batteries will be replaced before they've even reached half of their average lifespan of 25k miles. Therefore, for this distribution, setting maintenance intervals using MTTF means replacing batteries too soon and wasting lots of money.

In general, using the MTTF alone as is done with most known solutions, is not useful for maintenance planning because it does not factor in deviation, density, probability, etc. Further, it does not give any indication where maintenance intervals should be set in relation to the mean. Specifically, it fails to determine whether the interval should be 1 standard deviation below the mean as a safety buffer, 10% below, 5k miles below, etc.

In contrast, embodiments use a non-parametric kernel density approach to estimate the probability density function ("PDF") of the asset failures. The estimated PDF is used to derive a cumulative density function ("CDF") for the asset failures. An input of reliability rate targets for the asset part is received. Using the reliability target rate as a threshold, respective values from the CDF is picked up as the optimum maintenance schedule for an asset part.

Figure 6:
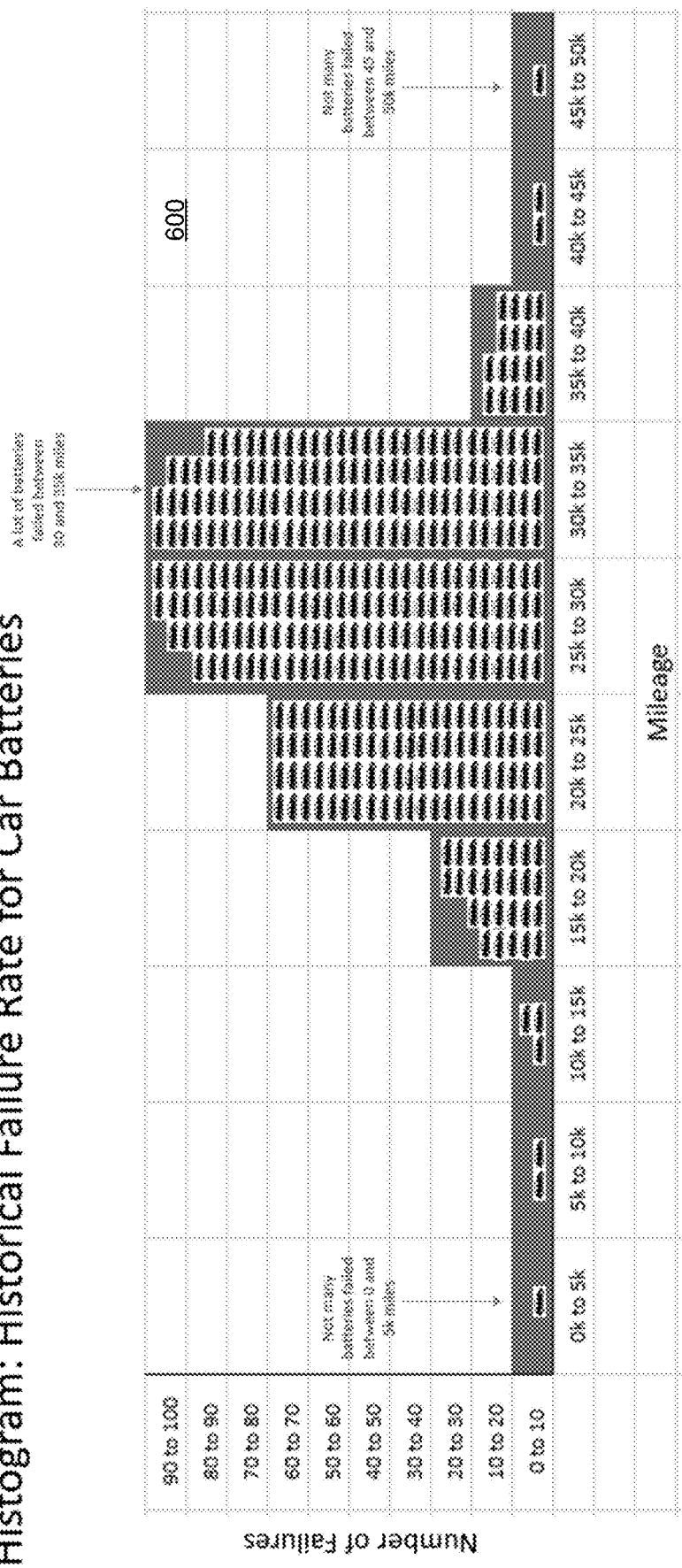
FIG. 6 is a histogram illustrating the historical failure rate for car batteries in accordance to embodiments of the invention.

FIG. 6 is a histogram 600 illustrating the historical failure rate for car batteries in accordance to embodiments of the invention. The information is received from sensors coupled to the batteries (or any other asset that is used). Histogram 600 provides information on how many miles were driven when the car battery failed. It is assumed, for purposes of embodiments, that historical failure information is the best predictor of future failure rate. In embodiments, historical information is fed to a system looking at the unscheduled work orders at the factory from data received from other service locations. Specifically, when the battery that was not supposed to fail actually does fail, the vehicle with the battery is brought to a service location (e.g., dealership, independent vehicle maintenance facility, etc.) and the miles and other sensor readings are captured using sensors attached to the battery and other parts, or a general sensor attached to the vehicle. Using this historical data for the battery and other parts, an optimized maintenance schedule is calculated as disclosed below.

Embodiments apply a kernel density estimation ("KDE") algorithm to the histogram to estimate a probability density function ("PDF"). KDE is a non-parametric way to estimate the probability density function of a random variable and is efficient to compute and maintain in a streaming environment. In one embodiment, the curve using KDE is calculated as follows:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),$$

where K is the kernel (i.e., a non-negative function) and h>0 is a smoothing parameter referred to as the bandwidth. The kernel function used in embodiments is the following Gaussian function:

$$K(u) = \frac{1}{\sqrt{2\pi}} e^{-\frac{1}{2}u^2}$$

Figure 7:
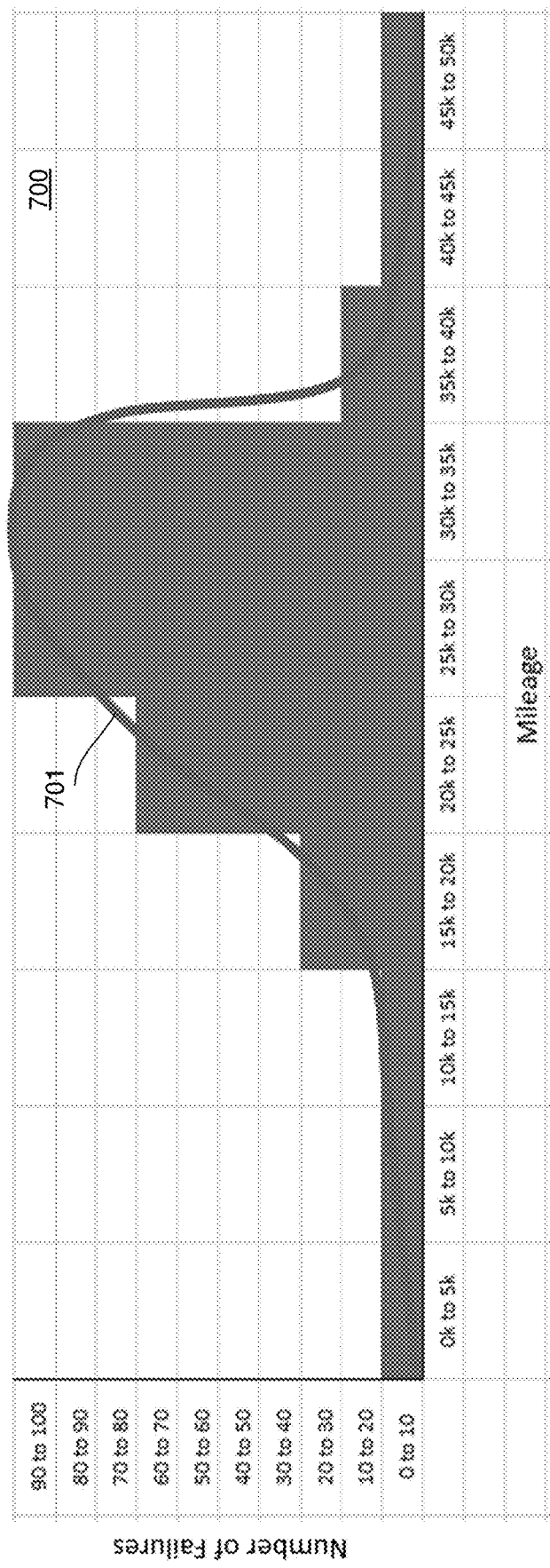
FIG. 7 is a graph illustrating the KDE curve for car batteries for generated from the histogram of FIG. 6 in accordance to embodiments of the invention.

FIG. 7 is a graph 700 illustrating the KDE curve 701 for car batteries for generated from histogram 600 of FIG. 6 in accordance to embodiments of the invention.

Figure 8:
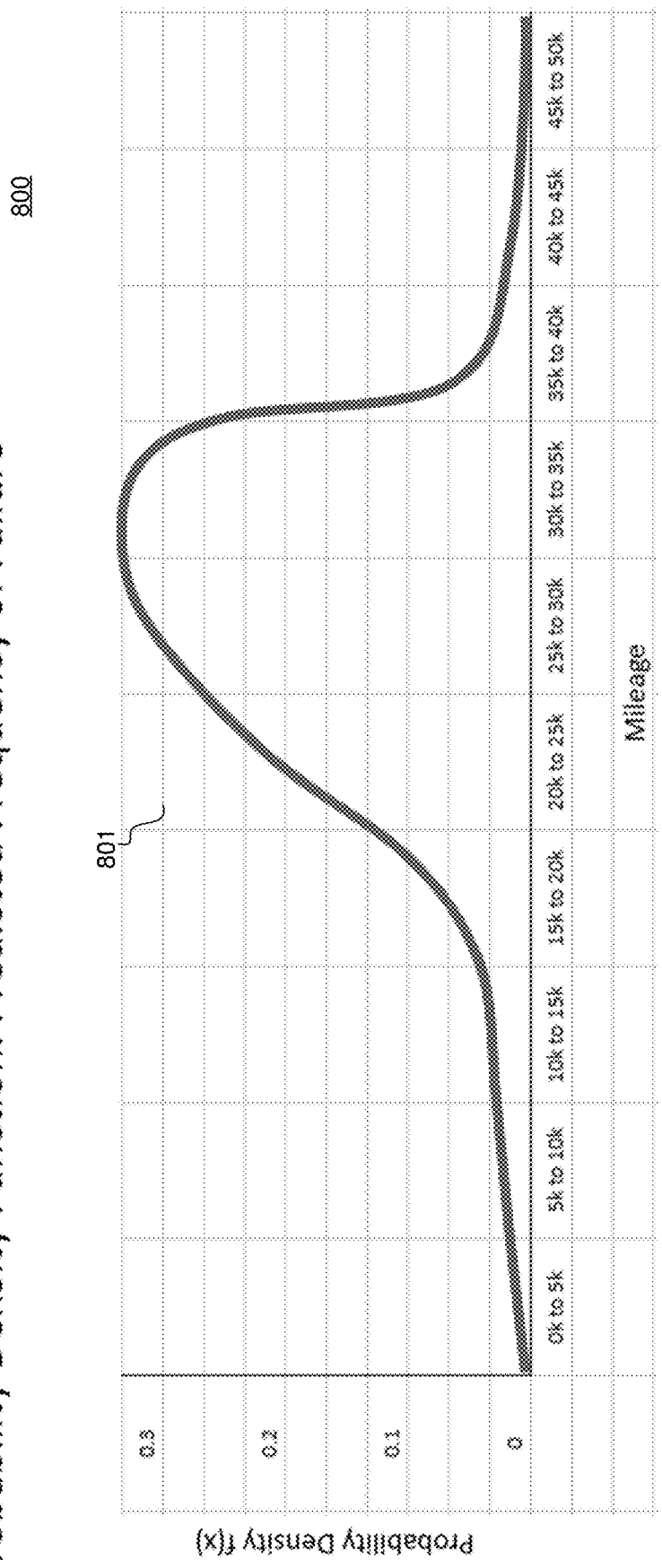
FIG. 8 is a graph of the PDF curve for the failure pattern for car batteries that is generated from the KDE curve of FIG. 7 in accordance to embodiments of the invention.

FIG. 8 is a graph 800 of the PDF curve 801 for the failure pattern for car batteries that is generated from KDE curve 701 of FIG. 7 in accordance to embodiments of the invention. PDF curve 801 is the same as curve 701 (i.e., it is generated using KDE). The area under PDF curve 801 for a mileage range gives the probability of failure occurring within that mileage range. The total range in the example of FIG. 8 is from 0 to 50k miles. Therefore, 100% of the area under the curve is between 0 and 50k miles, meaning that there is a 100% probability that a battery will fail somewhere between 0 and 50k miles.

Figure 9:
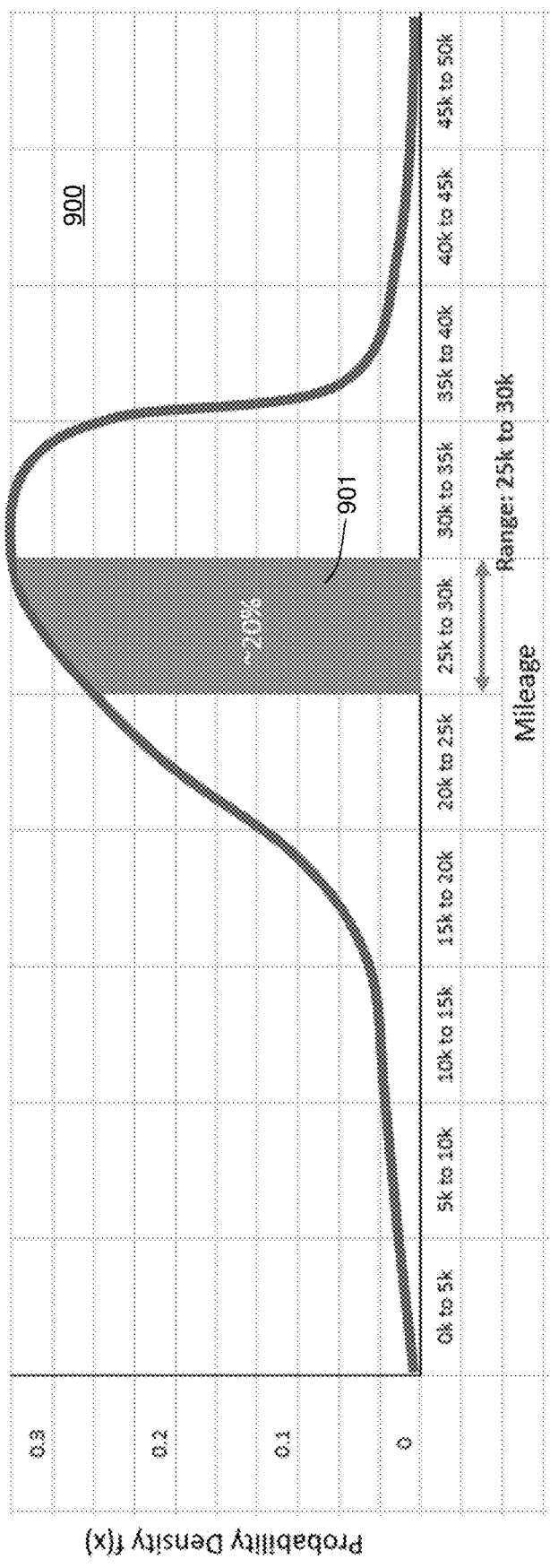
FIG. 9 is a graph of the PDF curve for the failure pattern for car batteries in accordance to embodiments of the invention.

FIG. 9 is a graph 900 of the PDF curve for the failure pattern for car batteries in accordance to embodiments of the invention. The example of FIG. 9 illustrates a determination of probability of a battery failing between 25k and 30k miles given this PDF curve. For the range from 25k to 30k miles, the area 901 under the curve is about 20% of the total area under the curve, so the probability of failure in this range is roughly 20%.

Figure 10:
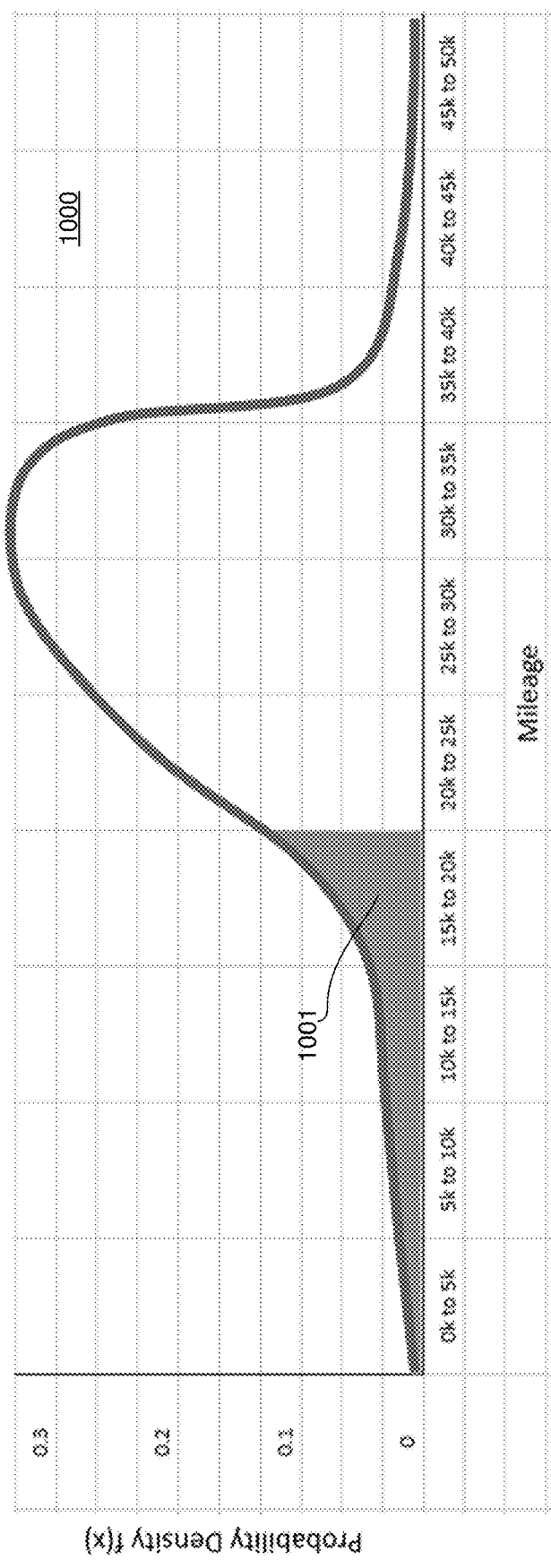
FIG. 10 is a graph of the PDF curve for the failure pattern for car batteries in accordance to embodiments of the invention.

FIG. 10 is a graph 1000 of the PDF curve for the failure pattern for car batteries in accordance to embodiments of the invention. The PDF curve is also used to determine the cumulative probability of failure by taking the area 1001 under the curve for the range from 0 to x miles. Cumulative probability 1001 provides an estimate of:

1. What percentage of batteries will fail by x miles?
2. What is the chance of any individual battery failing by x miles?

Figure 11:
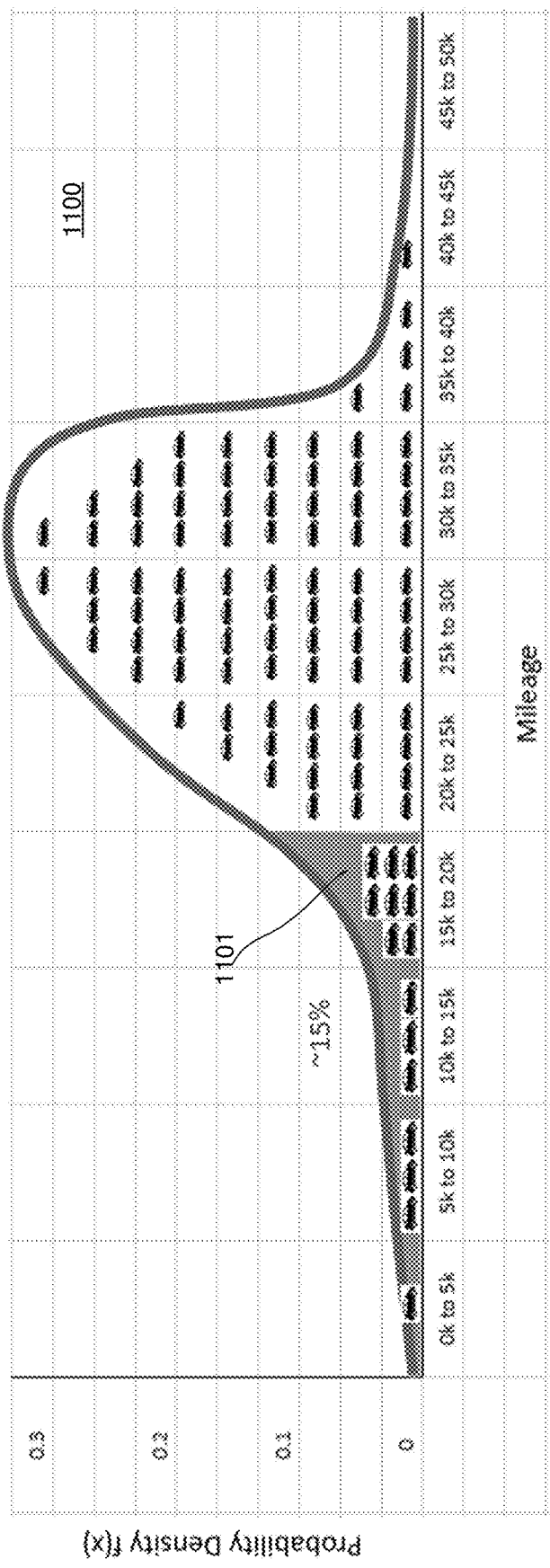
FIG. 11 is a graph of the PDF curve for the failure pattern for car batteries in accordance to embodiments of the invention.

FIG. 11 is a graph 1100 of the PDF curve for the failure pattern for car batteries in accordance to embodiments of the invention. In the example of FIG. 11, the area 1101 under the PDF curve from 0 miles to 20k miles represents approximately 15% of the total area under the curve. This means that by 20k miles, approximately 15% of the batteries in the population will have failed.

Businesses often set reliability rate targets for assets and parts. The minimum acceptable reliability rate is the complement of the maximum acceptable failure rate:

1. Failure Rate=1−Reliability Rate; and
2. Reliability Rate=1−Failure Rate.

For example, if minimum acceptable reliability rate is 85%, then 1−0.85=0.15, or a maximum acceptable failure rate of 15%. For example, if a business has a minimum acceptable reliability rate of 85% for batteries, the business is meeting its target reliability goal as long as less than 15% of batteries fail. Stated differently, how many miles can batteries be used before 15% of them fail?

Given a minimum reliability rate, and a PDF for an asset, embodiments calculate a threshold (i.e., an optimum failure rate of an asset) using heuristics by leveraging business driven reliability targets and the CDF of the obtained PDF for an asset. The threshold in embodiments is determined by determining the mean of the distribution and creating a window (i.e., upper and lower bound) around the mean using a span in the same units as that of the failure asset part. Embodiments then determine the mean of the window and find the CDF of the point. If the CDF of this point is approximately close to the reliability target set by the business, the mean is returned as the new optimized schedule for that part (e.g., the amount of miles where the asset is replaced). Otherwise, the upper bound or the lower bound of the window is moved depending on if the difference between the CDF of the calculated point and the reliability target set by the business and a new CDF is calculated.

Figure 12:
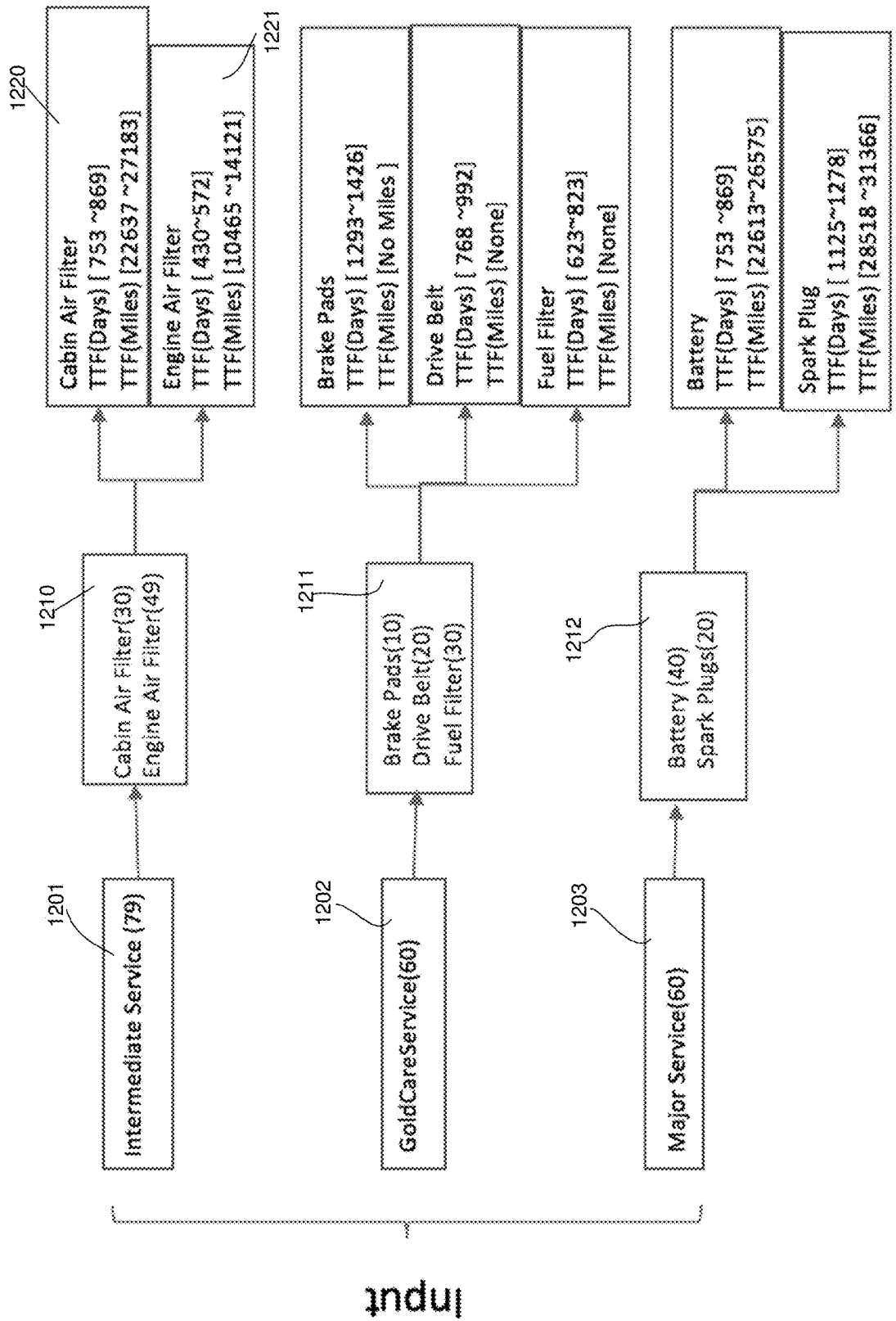
FIG. 12 illustrates a proposed list of maintenance tasks for assets as inputs for which a maintenance schedule needs to be determined in accordance with embodiments of the invention.

FIG. 12 illustrates a proposed list of maintenance tasks for assets as inputs for which a maintenance schedule needs to be determined in accordance with embodiments of the invention. The input includes three different maintenance programs/levels: intermediate service 1201, gold service 1202 and major service 1203. Each of these programs have different types of assets (i.e., car parts) defined under them and each type of asset is intended to be replaced as part of the respective service at a specified number of miles/days that is pre-determined by embodiments. Specifically, a cabin air filter and an engine air filter are replaced under intermediate maintenance program 1201 at 1210, brake pads, a drive belt and a fuel filter are replaced under gold maintenance program 1202 at 1211, and a battery and spark plugs are replaced under major service 1203 at 1212.

Embodiments of the invention, based on the failure pattern of each asset, determine a new optimized TTF to be implemented for each of the maintenance programs, including programs such as shown in FIG. 12 that replace multiple different assets. In other words, embodiments determine the optimized miles or days to be assigned for each of the programs 1201-1203. For the determination, input is received from a plurality of sensors coupled (directly or indirectly) to a plurality of each of the assets to acquire failure data. Some details of the acquired data is shown in the example of FIG. 12. For example, the cabin air filter has data from 30 assets (at 1210) as input and the failures range from 753-869 days, and from 22,637-27,183 miles (shown at 1220). Similarly, for the engine filter belonging to the same intermediate service program 1201, for the data from 49 assets (at 1210), failures occur from 430-572 days and from 10,465-14,121 miles (shown at 1221).

Embodiments can determine an optimized maintenance schedule value at a program level (e.g., programs 1201-1203) or at an individual asset level. At the program level, an example is a determination of "what" is the recommended maintenance schedule for intermediate service program 1201. At an asset level, the maintenance schedule for an individual type of asset (e.g., a cabin air filter) is determined.

Embodiments determine the optimized schedule using the PDF for each individual asset (e.g., the engine air filter and the cabin air filter) from the sensor data and based on a customer provided threshold (i.e., a desired reliability specified by the business) or calculated threshold.

The optimized schedule (e.g., number of miles or days) for a maintenance program is determined as the minimum of the Time To Failures ("TTF") calculated on the operations (part) under the specific maintenance program. For example, for intermediate service 1201, the minimum of the TTF of both the cabin air filter and the engine air filter is used as the optimized schedule.

Figure 13:
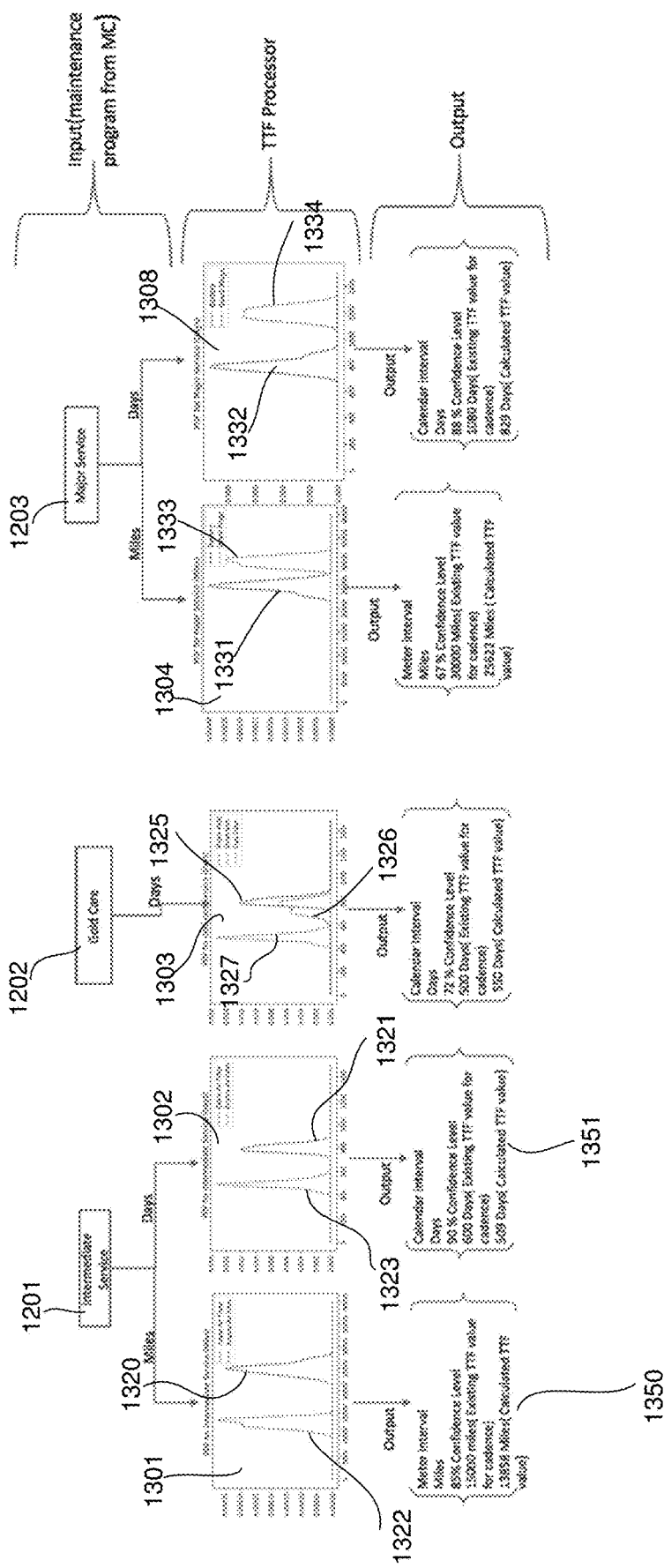
FIG. 13 is a functional block diagram of functionality to determine an optimized maintenance schedule for the example of FIG. 12 in accordance to embodiments.

FIG. 13 is a functional block diagram of functionality to determine an optimized maintenance schedule for the example of FIG. 12 in accordance to embodiments. For each of programs 1201-1203, a KDE curve is used to generated an individual probability density function for each operation and for each measuring unit. Specifically, the KDE for the cabin air filter is shown at 1320 for miles and at 1321 for days (in graphs 1301 and 1302, respectively). For days (there is no miles units for gold program 1202), the KDE for the brake pads is shown at 1325, the fuel filter is shown at 1326 and the drive belt is shown at 1327 (in graph 1303). For major service 1203, the KDE for the battery is shown for miles at 1331 and for days at 1332, and the KDE for the spark plugs is shown for miles at 1333 and for days at 1334 (in graphs 1304 and 1308, respectively).

From the calculated PDF and using the reliability rate to determine a threshold, embodiments determine a CDF value, which is the TTF calculated for individual operation. Then, for all calculated TTFs under a single maintenance program a minimum value is selected as a calculated TTF for that program for a particular measuring unit (e.g., days, miles, etc.). If the calculated TTF for a maintenance program is less than the existing program, this is a case of "PULL IN" (i.e., reduce the maintenance schedule). If the calculated TTF for a maintenance program is greater than the existing TTF, this is a case of "PUSH OUT" (i.e., increase the maintenance schedule).

Figure 14:
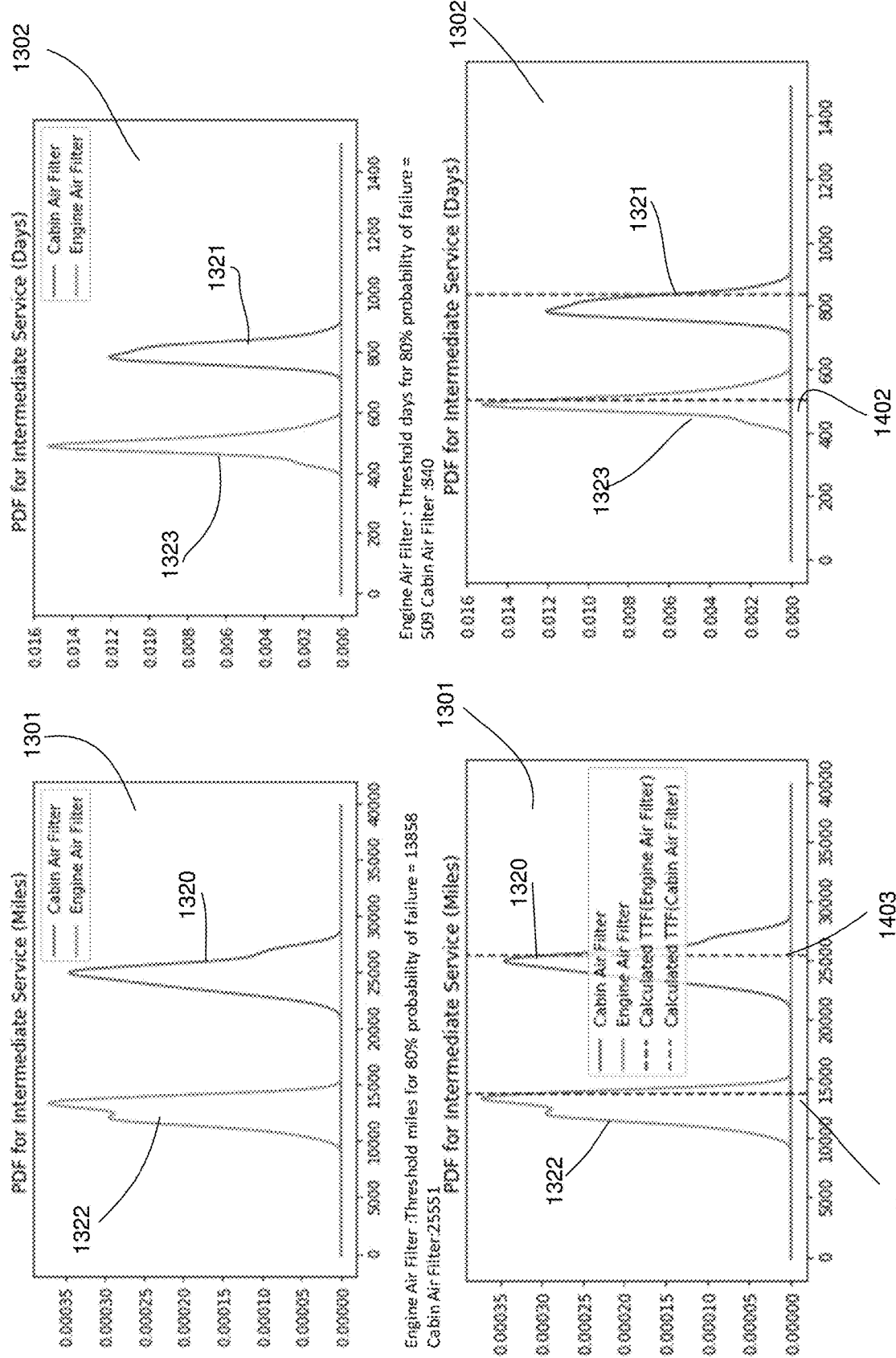
FIG. 14 illustrates additional views of graphs of FIG. 13 in accordance to embodiments.
Figure 15:
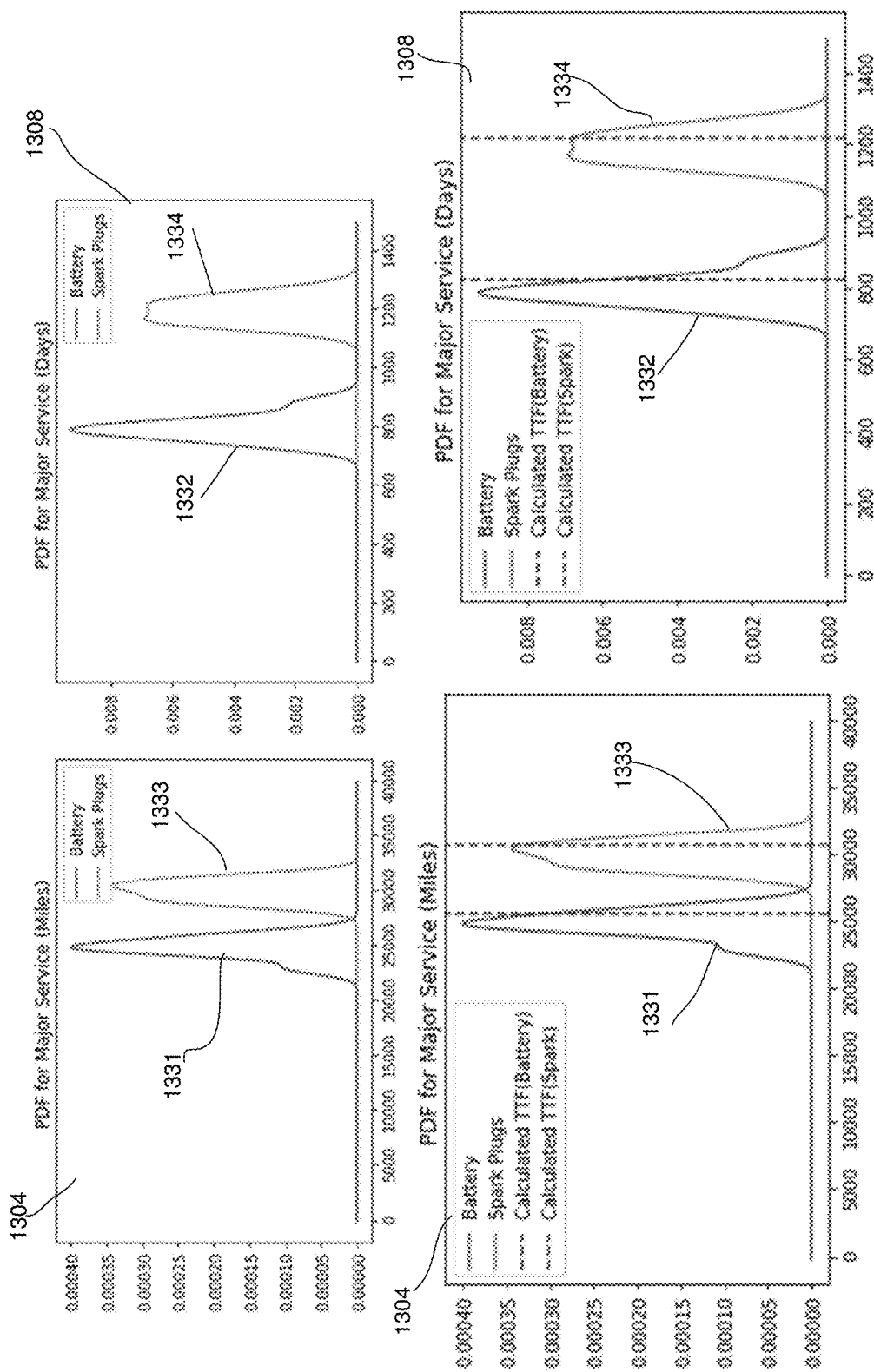
FIG. 15 illustrates additional views of graphs of FIG. 13 in accordance to embodiments.

FIG. 14 illustrates additional views of graphs 1301 and 1302 of FIG. 13 in accordance to embodiments. FIG. 15 illustrates additional views of graphs 1304 and 1308 of FIG. 13 in accordance to embodiments.

For example, embodiments output 1350 for intermediate service 1201 a calculated TTF value of 13,853 miles (versus a 15,000 miles existing TTF), shown at 1401 of FIG. 14, and a calculated TTF value of 509 days (versus a 600 days existing TTF), shown at 1402 of FIG. 14, and an 85% and 90% confidence level, respectively. The outputs are the minimum value when services have more than one asset (i.e., in 1301, the TTF for the engine air filter is 13,853 miles at 1401 and the TTF for the cabin air filter is 25,551 miles at 1403).

Additionally, a "confidence level" is calculated which specifies the confidence percentage of the recommend TTF prediction. Confidence level is calculated in embodiments by splitting the data into a training and a test data set and using a k-fold cross-validation procedure. Embodiments create a PDF on the training data set and validate the training data set on the test data sets over a number of iterations using the following steps:

1) Implement a K-fold cross validation split on the training set (5 folds in one embodiment).
2) Using trained data and the test split for all the folds, execute the following for all folds:
   a) train a KDE model on the training split and estimate scores on training set data.
   b) Get min and max scores assigned to the training points by the KDE model.
   c) Generate similar scores for the test set of the split.
   d) Compute the percentage of test points within the score bounds of training points.
3) Take the average of this percentage over all folds, which is the confidence value.

Figure 16:
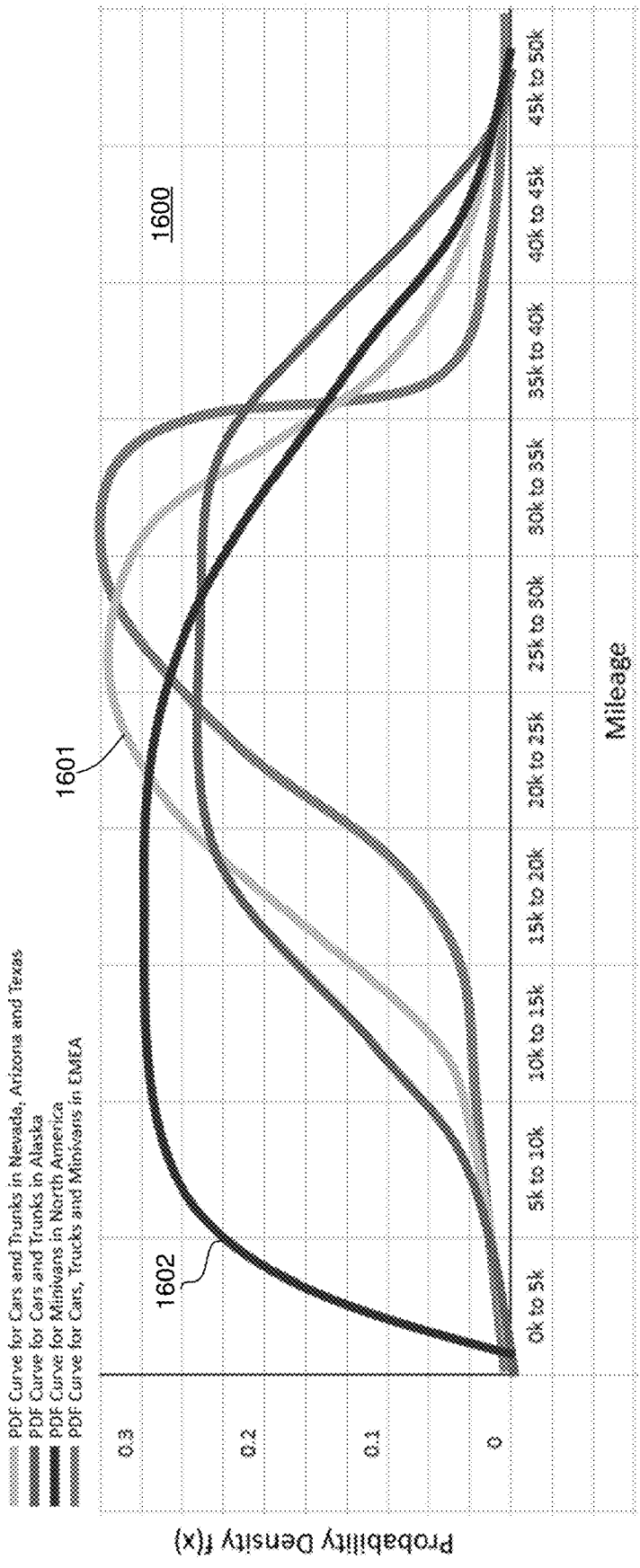
FIG. 16 is a graph of multiple PDF curves for sub-groups of a single asset (e.g., a battery or a car filter) in accordance to embodiments of the invention.

FIG. 16 is a graph 1600 of multiple PDF curves for sub-groups of a single asset (e.g., a battery or a car filter) in accordance to embodiments of the invention. For example, curve 1601 is for cars and trucks in Nevada, Arizona and Texas, and curve 1602 is for minivans in North America. In embodiments, machine learning is used to cluster asset groups into sub-groups with similar failure patterns and characteristics. This allows more refined models to be created to improve predictive accuracy for each sub-group. Machine learning (e.g., clustering based on a unique combination of parameters) can identify which attributes (location, configuration, usage patterns, etc.) have the greatest predictive power.

Figure 17:
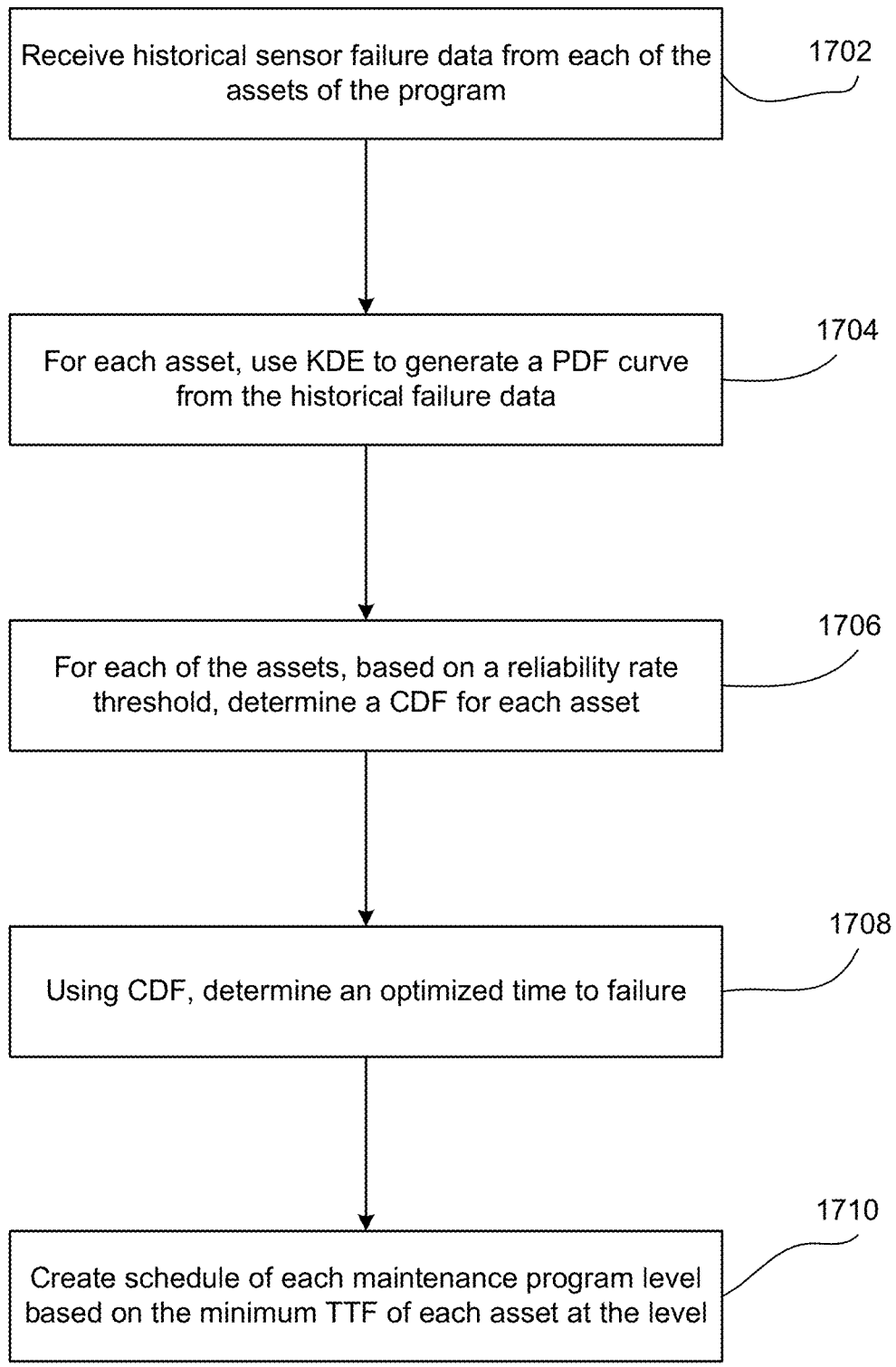
FIG. 17 is a flow diagram of the functionality of the optimized maintenance schedule module of FIG. 2 for determining an optimized maintenance schedule for an asset using a network of sensors in accordance with one embodiment.

FIG. 17 is a flow diagram of the functionality of optimized maintenance schedule module 16 of FIG. 2 for determining an optimized maintenance schedule for an asset using a network of sensors in accordance with one embodiment. In one embodiment, the functionality of the flow diagram of FIG. 17 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 17 is performed for a maintenance program that has multiple levels, each level which may involve the replacement of multiple assets.

At 1702, historical sensor failure data from each of the assets of the program is received. A reliability rate threshold for each asset is also received.

At 1704, for each asset, KDE is used to generate a PDF curve from the historical failure data.

At 1706, for each of the assets, based on the reliability rate threshold, a CDF for each asset is determined. Specifically, the reliability rate threshold is an allowable percentage of that asset that would be allowed to fail, and the CDF is the area under the PDF curve that equals the reliability rate threshold and the corresponding miles/days of the x-axis.

At 1708, from the CDF, an optimized time to failure in one or more different units (e.g., days or miles) for the replacement or failure for each of the assets is determined.

At 1710, at each maintenance program level that has multiple assets (or for levels with only a single asset), the minimum calculated TTF at 1708 is used as schedule for that program.

As disclosed, embodiments determine an optimized maintenance schedule for a maintenance program with multiple levels using a PDF and CDF for each asset to determine a TTF for each asset, and then using the minimum TTF for each level.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of determining an optimized maintenance schedule for a maintenance program comprising multiple levels, each level comprising at least one asset and at least one of the levels comprising a plurality of assets, the method comprising:
   receiving historical failure data for each of the assets, the historical failure data generated at least in part by a sensor network;
   for each asset, generating a probability density function (PDF) using kernel density estimation (KDE);
   for each asset, based on a reliability rate threshold, determining a cumulative density function (CDF) using the PDF;
   for each asset, determining an optimized time to failure (TTF) using the CDF; and
   creating the schedule for each level that comprises a minimum TTF for all of the assets at each level.

2. The method of claim 1, wherein the reliability rate threshold is based on a received minimum reliability rate and is determined using a mean of the PDF and a mean of a window around the mean of the PDF.

3. The method of claim 1, wherein the maintenance program is for an automobile, and the assets are parts for the automobile.

4. The method of claim 3, wherein the minimum TTF is based on a mileage of the automobile or on a number of days of age of the automobile.

5. The method of claim 1, further comprising calculating a confidence level for the determined optimized TTF.

6. The method of claim 5, wherein the calculating comprises using K-fold cross validation.

7. The method of claim 1, wherein generating the PDF using KDE comprises:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),$$

where K is a kernel comprising a non-negative function and h comprises a smoothing parameter and is greater than 0.

8. The method of claim 1, further comprising using machine learning to cluster groups of the assets into sub-groups to improve an accuracy of the optimized TTF.

9. A non-transitory computer-readable medium storing instructions which, when executed by one or more processors, cause the processors to determine an optimized maintenance schedule for a maintenance program comprising multiple levels, each level comprising at least one asset and at least one of the levels comprising a plurality of assets, the determining comprising:
receiving historical failure data for each of the assets, the historical failure data generated at least in part by a sensor network;
for each asset, generating a probability density function (PDF) using kernel density estimation (KDE);
for each asset, based on a reliability rate threshold, determining a cumulative density function (CDF) using the PDF;
for each asset, determining an optimized time to failure (TTF) using the CDF; and
creating the schedule for each level that comprises a minimum TTF for all of the assets at each level.

10. The computer-readable medium of claim 9, wherein the reliability rate threshold is based on a received minimum reliability rate and is determined using a mean of the PDF and a mean of a window around the mean of the PDF.

11. The computer-readable medium of claim 9, wherein the maintenance program is for an automobile, and the assets are parts for the automobile.

12. The computer-readable medium of claim 11, wherein the minimum TTF is based on a mileage of the automobile or on a number of days of age of the automobile.

13. The computer-readable medium of claim 9, the determining further comprising calculating a confidence level for the determined optimized TTF.

14. The computer-readable medium of claim 13, wherein the calculating comprises using K-fold cross validation.

15. The computer-readable medium of claim 9, wherein generating a-the PDF using KDE comprises:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),$$

where K is a kernel comprising a non-negative function and h comprises a smoothing parameter and is greater than 0.

16. The computer-readable medium of claim 9, the determining further comprising using machine learning to cluster groups of the assets into sub-groups to improve an accuracy of the optimized TTF.

17. A cloud based sensor system for determining an optimized maintenance schedule for a maintenance program comprising multiple levels, each level comprising at least one asset and at least one of the levels comprising a plurality of assets, the system comprising:
a plurality of sensors coupled to assets and in communication over a network;
one or more processors that receives historical failure data for each of the assets from sensor readings of asset failures and, for each of the assets;
generating a probability density function (PDF) using kernel density estimation (KDE);
based on a reliability rate threshold, determining a cumulative density function (CDF) using the PDF;
determining an optimized time to failure (TTF) using the CDF;
the processors creating the schedule for each level that comprises a minimum TTF for all of the assets at each level.

18. The system of claim 17, wherein the reliability rate threshold is based on a received minimum reliability rate and is determined using a mean of the PDF and a mean of a window around the mean of the PDF.

19. The system of claim 17, wherein the maintenance program is for an automobile, and the assets are parts for the automobile.

20. The system of claim 19, wherein the minimum TTF is based on a mileage of the automobile or on a number of days of age of the automobile.

* * * * *